3,055,740
METHOD FOR THE PREPARATION OF DINITROGEN DIFLUORIDE

George Neil Sausen, Wilmington, Del., assignor to E. I. du Pont de Nemours and Company, Wilmington, Del., a corporation of Delaware
No Drawing. Filed Sept. 14, 1960, Ser. No. 55,863
9 Claims. (Cl. 23—205)

This invention relates to a novel method for preparing dinitrogen difluoride.

Dinitrogen difluoride, $N_2F_2$, is a normally gaseous material which occurs in both the cis and trans isomeric forms. This compound has recently become of great technical interest because of its ability to initiate the polymerization of unsaturated compounds. Thus, dinitrogen difluoride initiates the polymerization of methyl methacrylate at 25° C. and the polymerization of tetrafluoroethylene at 75° C.

Dinitrogen difluoride was first prepared by careful decomposition of fluorine azide. This method is hazardous since fluorine azide is explosive and its preparation requires the use of hazardous reagents, i.e., hydrogen azide and elemental fluorine. More recent methods for the synthesis of dinitrogen difluoride include reaction of nitrogen trifluoride with mercury in an electric discharge, and electrolysis of molten ammonium bifluoride. These methods give dinitrogen tetrafluoride, $N_2F_4$, as a by-product.

It has now been found that dinitrogen difluoride can be prepared by reacting dinitrogen tetrafluoride with a metal carbonyl or with a mixture of carbon monoxide and a carbonyl-forming metal.

Dinitrogen tetrafluoride $(N_2F_4)$ can be prepared as described in the literature by Colburn and Kennedy, J. Am. Chem. Soc. 80, 5004 (1958).

The precise mechanism of the reaction is not known but the over-all effect is defluorination of $N_2F_4$ to $N_2F_2$. The fluorine removed is recovered, in part at least, in the form of metal fluoride. Some carbonyl fluoride has also been detected in the products.

The temperature at which the process is carried out varies with the reactivity of the metal carbonyl or metal/carbon monoxide mixture. In the case of highly reactive metal carbonyls, e.g., $Fe(CO)_5$, reaction occurs at ordinary temperatures (25° C.) or even below. In the case of the more stable metal carbonyls, such as $Ni(CO)_4$, $Cr(CO)_6$, and $Mo(CO)_6$, temperatures in the 75–175° C. range are used. However, it is desirable to keep the temperature as low as practical for the stability of $N_2F_2$ decreases with increasing temperature, and decomposition becomes fairly rapid as one approaches 150° C. The process can be carried out at reduced, ordinary, or superatmospheric pressures.

For a specific defluorinating agent, the reaction or contact time at which the process is carried out varies inversely with the temperature and it also varies with the particular defluorinating agent used. Thus, the contact time can vary from a few seconds in a continuous process carried out with an active metal carbonyl at a high temperature, e.g., 175° C., to as much as two hours or even more when the process is conducted at a low temperature such as 0° C.

The ratio of $N_2F_4$ to metal carbonyl or metal/carbon monoxide mixture is not highly critical. However, since metal carbonyls have a tendency to react with $N_2F_2$, it is desirable to use only sufficient metal carbonyl to defluorinate $N_2F_4$ to $N_2F_2$. This will generally mean that the atom ratio of metal in the carbonyl or metal/carbon monoxide mixture to the holes of $N_2F_4$ should not materially exceed $$\frac{2}{n}:1$$

where $n$ is the valence of the metal in its normal fluoride. When metal plus carbon monoxide is used as the defluorinating agent, the ratio of metal to CO can be varied widely but preferably the amount of CO is in the range for metal carbonyl formation or higher. When a preformed metal carbonyl is used as reactant, it is also desirable to add some carbon monoxide.

The preferred metal carbonyls are those of iron, cobalt, and nickel. However, other metal carbonyls and carbonyl-forming metal/carbon monoxide mixtures can be used. As indicated by Emeleus and Anderson, "Modern Aspects of Inorganic Chemistry," 1952 Edition, page 408, the metals forming carbonyls are Cr, Fe, Co, Ni, Cu, Mo, Ru, Rh, Pd, Ag, W, Re, Os, Ir, Pt, and Au.

The preparation of $N_2F_2$ according to the process of this invention can be carried out either as a batch operation or in a continuous flow system. The resultant reaction product will usually contain some unreacted $N_2F_4$ since it is desirable to use an excess of $N_2F_4$ rather than of the defluorinating agent (metal carbonyl or metal+carbon monoxide). Minor amounts of $NF_3$ are also formed. The $N_2F_2$ can be separated from the reaction products by gas chromatography.

The process is illustrated more specifically in the following examples which however, are not to be construed as limiting the process of the present invention. Product analyses are reported in mole percent.

Example I

An evacuated glass vessel was charged with $N_2F_4$, $Ni(CO)_4$, and CO in a molar ratio of 3.7:1:8.7, respectively. The reactants were measured manometrically, as gases, and the final total pressure in the system was 1 atmosphere at 25° C. The vessel was closed and heated at 100° C. for 15 minutes. It was then cooled to −196° C. and evacuated to less than 1 mm. pressure to remove non-condensable gases. The vessel was allowed to warm to room temperature, and the gaseous reaction products were analyzed by gas chromatography. The analysis showed the presence of 75% unreacted $N_2F_4$, 14% t-$N_2F_2$, 6% c-$N_2F_2$, 1% $N_2O$, 1% $NF_3$, 1% CO, and 0.8% $N_2$/air. The $N_2F_2$ peak was separated and analyzed by mass spectrometry to confirm the $N_2F_2$ structure. Solid $NiF_2$ was found as a coating on the walls of the reaction vessel. The molar ratio of $N_2F_2/(N_2F_2+N_2F_4)$ is 21%, i.e., 21% of the total nitrogen fluorides in the product is $N_2F_2$.

Example II

An evacuated glass vessel was charged with $N_2F_4$ and $Ni(CO)_4$ in a molar ratio of 3.7:1 to give a final total pressure in the system of 0.3 atm. at 25° C. The vessel was closed and heated at 100° C. for 18 minutes. The vessel was cooled to room temperature, and the reaction mixture was analyzed by gas chromatography. The analysis showed the presence of 52% $N_2F_4$, 5% t-$N_2F_2$, 3% c-$N_2F_2$, 38% CO, 1% $N_2O$, 0.8% $NF_3$, and 1% $N_2$ and/or air. The molar ratio of $N_2F_2(N_2F_2+N_2F_4)$ is 13%.

Example III

An evacuated nickel vessel was charged with $N_2F_4$ and CO in a molar ratio of 1:1. The final total pressure in the container was 1 atmosphere at 25° C. The vessel was heated at 100° C. for 25 minutes, cooled to room temperature, and the reaction mixture analyzed by gas chromatography. The analysis showed the gas mixture to contain 61% $N_2F_4$, 0.2% t-$N_2F_2$, a trace of c-$N_2F_2$, 2% $N_2O$, 0.2% $NF_3$, and 38% CO. The molar ratio of $N_2F_2/N_2F_2+N_2F_4$ is 0.3%.

In a similar reaction, the nickel vessel, containing $N_2F_4$ and CO in a molar ratio of 1:1, was heated at 170–185° C. for one hour, and then cooled to room temperature. Gas chromatographic analysis of the products showed a molar ratio of $N_2F_2/N_2F_2+N_2F_4=0.1\%$.

*Example IV*

A glass vessel containing $Cr(CO)_6$ was evacuated and charged with $N_2F_4$ and CO. The final total pressure in the vessel was 1.3 atm. at 25° C., and the molar ratio of reactants was $N_2F_4:Cr(CO)_6:CO$ of 2.5:1:8, respectively. The vessel was heated at 100° C. for 30 minutes, cooled to room temperature, and the reaction mixture was analyzed by gas chromatography. The analysis showed 31% $N_2F_4$, 0.03% t-$N_2F_2$, 0.06% $NF_3$, 0.4% $N_2O$, and 69% CO. The molar ratio of $N_2F_2/(N_2F_2+N_2F_4)$ is 0.1%.

In a similar reaction in which the $Cr(CO)_6$ was replaced with an equimolar quantity of $Mo(CO)_6$ and the reactants were heated at 100° C. for 30 minutes, gas chromatographic analysis showed the reaction mixture to contain 34% $N_2F_4$, 0.1% t-$N_2F_2$, a trace of c-$N_2F_2$, 0.07% $NF_3$, a trace of $N_2O$, and 65% CO. The molar ratio of $N_2F_2/N_2F_2+N_2F_4$ is 0.3%.

*Example V*

A glass vessel containing $Fe(CO)_5$ was evacuated and charged with $N_2F_4$ and CO. The final total pressure in the vessel was 1.3 atm. at 25° C., and the molar ratio of reactants was $N_2F_4:Fe(CO)_5:CO$ of 1:5:3.3. The reaction was allowed to proceed for 15 minutes at 25° C., and the reaction mixture was then analyzed by gas chromatography. The analysis showed 4% $N_2F_4$, 0.5% t-$N_2F_2$, 0.1% $N_2O$, 86% CO, and 10% $N_2$/air. The molar ratio of $N_2F_2/N_2F_2+N_2F_4$ is 11%.

*Example VI*

A glass vessel containing $Co_2[(CO)_4]_2$ was evacuated and charged with $N_2F_4$ and CO. The final total pressure in the vessel was 1.3 atm., at 25° C., and the molar ratio of reactants was $N_2F_4:Co_2[(CO)_4]_2:CO$ of 4:1:12, respectively. The vessel was heated at 100° C. for 15 minutes, cooled to room temperature, and the gaseous reaction products analyzed by gas chromatography. The analysis showed 21% $N_2F_4$, 0.5% t-$N_2F_2$, 0.2% $N_2O$, 0.3% $NF_3$, and 78% CO. The molar ratio of $N_2F_2/N_2F_2+N_2F_4$ is 2.3%.

I claim:
1. A process for the preparation of dinitrogen difluoride which comprises reacting dinitrogen tetrafluoride with a reagent selected from the group consisting of metal carbonyls and mixtures of carbon monoxide and a carbonyl-forming metal at a temperature below 175° C.
2. A process for the preparation of dinitrogen difluoride which comprises reacting dinitrogen tetrafluoride with a metal carbonyl at a temperature below 175° C.
3. The process as set forth in claim 2 wherein the reaction is carried out in the presence of carbon monoxide.
4. The process as set forth in claim 2 wherein the metal carbonyl is nickel carbonyl.
5. The process as set forth in claim 2 wherein the metal carbonyl is chromium carbonyl.
6. The process as set forth in claim 2 wherein the metal carbonyl is iron carbonyl.
7. The process as set forth in claim 2 wherein the metal carbonyl is cobalt carbonyl.
8. A process for the preparation of dinitrogen difluoride which comprises reacting dinitrogen tetrafluoride with a carbonyl-forming metal in the presence of excess carbon monoxide, based on in situ formation of metal carbonyl, at a temperature below 175° C.
9. The process set forth in claim 8 wherein the metal is nickel.

No references cited.

UNITED STATES PATENT OFFICE
CERTIFICATE OF CORRECTION

Patent No. 3,055,740            September 25, 1962

George Neil Sausen

It is hereby certified that error appears in the above numbered patent requiring correction and that the said Letters Patent should read as corrected below.

Column 2, line 1, for "holes" read -- moles --; line 62, for "$N_2F_2(N_2F_2+N_2F_4)$" read -- $N_2F_2/(N_2F_2+N_2F_4)$ --; column 3, lines 2, 7, 27 and 38, and column 4, line 11, for "$N_2F_2/N_2F_2+N_2F_4$" read -- $N_2F_2/(N_2F_2+N_2F_4)$ --.

Signed and sealed this 5th day of February 1963.

(SEAL)
Attest:

ERNEST W. SWIDER                 DAVID L. LADD
Attesting Officer                 Commissioner of Patents